United States Patent
Mukherjee et al.

(10) Patent No.: US 10,339,054 B2
(45) Date of Patent: Jul. 2, 2019

(54) INSTRUCTION ORDERING FOR IN-PROGRESS OPERATIONS

(71) Applicant: Cavium, LLC, Santa Clara, CA (US)

(72) Inventors: Shubhendu Sekhar Mukherjee, Southborough, MA (US); Albert Ma, Belmont, MA (US); Mike Bertone, Marlborough, MA (US)

(73) Assignee: Cavium, LLC, Santa Clara, CA (US)

( * ) Notice: Subject to any disclaimer, the term of this patent is extended or adjusted under 35 U.S.C. 154(b) by 0 days.

(21) Appl. No.: 15/890,921

(22) Filed: Feb. 7, 2018

(65) Prior Publication Data

US 2018/0165197 A1 Jun. 14, 2018

Related U.S. Application Data

(63) Continuation of application No. 14/542,136, filed on Nov. 14, 2014, now Pat. No. 9,910,776.

(51) Int. Cl.
*G06F 12/08* (2016.01)
*G06F 12/10* (2016.01)
(Continued)

(52) U.S. Cl.
CPC ...... *G06F 12/0808* (2013.01); *G06F 12/0895* (2013.01); *G06F 12/1009* (2013.01)

(58) Field of Classification Search
None
See application file for complete search history.

(56) References Cited

U.S. PATENT DOCUMENTS

| | | | | |
|---|---|---|---|---|
| 4,680,700 A | * | 7/1987 | Hester | G06F 12/1018 711/206 |
| 5,724,549 A | * | 3/1998 | Selgas | G06F 12/0831 711/135 |

(Continued)

OTHER PUBLICATIONS

TLB Shootdown Examples; Comment by Shanley; As published on the internet before 2005 at http://comp.lang.asm.x86.narkive.com/BxiY5WkQ/tlb-shootdown-examples (Year: 2005).*

(Continued)

*Primary Examiner* — Reginald G Bragdon
*Assistant Examiner* — Paul M Knight
(74) *Attorney, Agent, or Firm* — Young Basile Hanlon & MacFarlane, P.C.

(57) ABSTRACT

Execution of the memory instructions is managed using memory management circuitry including a first cache that stores a plurality of the mappings in the page table, and a second cache that stores entries based on virtual addresses. The memory management circuitry executes operations from the one or more modules, including, in response to a first operation that invalidates at least a first virtual address, selectively ordering each of a plurality of in progress operations that were in progress when the first operation was received by the memory management circuitry, wherein a position in the ordering of a particular in progress operation depends on either or both of: (1) which of one or more modules initiated the particular in progress operation, or (2) whether or not the particular in progress operation provides results to the first cache or second cache.

32 Claims, 3 Drawing Sheets

(51) Int. Cl.
*G06F 12/0808* (2016.01)
*G06F 12/1009* (2016.01)
*G06F 12/0895* (2016.01)

(56) References Cited

U.S. PATENT DOCUMENTS

| | | | | |
|---|---|---|---|---|
| 5,758,051 | A * | 5/1998 | Moreno | G06F 9/3834 |
| | | | | 712/E9.048 |
| 5,906,001 | A | 5/1999 | Wu et al. | |
| 6,035,118 | A * | 3/2000 | Lauterbach | G06F 9/30174 |
| | | | | 712/233 |
| 6,163,815 | A * | 12/2000 | Fields, Jr. | G06F 13/4027 |
| | | | | 710/28 |
| 6,591,359 | B1 * | 7/2003 | Hass | G06F 9/384 |
| | | | | 712/217 |
| 6,718,494 | B1 * | 4/2004 | Jamil | G06F 11/1064 |
| | | | | 711/E12.061 |
| 6,886,085 | B1 * | 4/2005 | Shuf | G06F 9/30047 |
| | | | | 711/143 |
| 7,073,043 | B2 | 7/2006 | Arimilli et al. | |
| 7,617,378 | B2 | 11/2009 | Arimilli et al. | |
| 7,788,464 | B2 | 8/2010 | Sheu et al. | |
| 7,853,754 | B1 | 12/2010 | Agarwal et al. | |
| 7,865,670 | B2 | 1/2011 | Cota-Robles et al. | |
| 8,112,174 | B2 | 2/2012 | Hsieh et al. | |
| 8,301,865 | B2 | 10/2012 | Grohoski et al. | |
| 8,392,661 | B1 | 3/2013 | Metcalf | |
| 9,086,987 | B2 | 7/2015 | Cain, III et al. | |
| 9,298,621 | B2 | 3/2016 | Li et al. | |
| 2002/0065993 | A1 * | 5/2002 | Chauvel | G06F 1/206 |
| | | | | 711/144 |
| 2004/0073773 | A1 * | 4/2004 | Demjanenko | G06F 9/30036 |
| | | | | 712/7 |
| 2007/0150675 | A1 * | 6/2007 | Arimilli | G06F 12/1441 |
| | | | | 711/162 |
| 2008/0005544 | A1 * | 1/2008 | Jourdan | G06F 9/3802 |
| | | | | 712/239 |
| 2008/0034187 | A1 * | 2/2008 | Stempel | G06F 9/3804 |
| | | | | 712/205 |
| 2008/0155168 | A1 * | 6/2008 | Sheu | G06F 12/1027 |
| | | | | 711/6 |
| 2009/0216994 | A1 * | 8/2009 | Hsieh | G06F 12/1027 |
| | | | | 711/207 |
| 2010/0332787 | A1 * | 12/2010 | Grohoski | G06F 12/1027 |
| | | | | 711/207 |
| 2013/0117521 | A1 * | 5/2013 | Li | G06F 12/0813 |
| | | | | 711/170 |
| 2014/0115297 | A1 * | 4/2014 | Cain | G06F 12/1027 |
| | | | | 711/207 |

OTHER PUBLICATIONS

DiDi: Mitigating the Performance Impact of TLB Shootdowns Using a Shared TLB Directory by Villajieja; IEEE 2011 (Year: 2011).*

UNified Instruction/Translation/Data (UNITD) Coherence: One Protocol to Rule Them All by Romanescu; International Symposium on High Performance Computer Architecture; 2010 (Year: 2010).*

Address Translation Aware Memory Consistency by Romanescu; IEEE 2011 (Year: 2011).*

Romanescu, "Address Translation Aware Memory Consistency." IEEE, 2011, 10 pages.

TLB Shootdown Examples, Comment by Shanley; As published on the internet before 2005 at http://comp.lang.asm.x86.narkive.com/BxiY5WkQ/tlb-shootdown-examples, 2 pages.

Merriam Webster's Dictionary; Affect; as published Jun. 10, 2011 at http://www.merriam-webster.com/dictionary/affect, 2 pages.

Romanescu, Bogdan F., Alvin R. Lebeck, Daniel J. Sorin, and Anne Bracy. "UNified instruction/translation/data (UNITD) coherence: One protocol to rule them all." In High Performance Computer Architecture (HPCA), 2010 IEEE 16th International Symposium on, pp. 1-12. IEEE, 2010.

Villavieja, Carlos, Vasileios Karakostas, Lluis Vilanova, Yoav Etsion, Alex Ramirez, Avi Mendelson, Nacho Navarro, Adrian Cristal, and Osman S. Unsal. "Didi: Mitigating the performance impact of tlb shootdowns using a shared tlb directory." In Parallel Architectures and Compilation Techniques (PACT), 2011 International Conference on, pp. 340-349. IEEE, 2011.

* cited by examiner

INSTRUCTION ORDERING FOR IN-PROGRESS OPERATIONS

CROSS-REFERENCE TO RELATED APPLICATIONS

This application is a continuation of and claims priority to U.S. application Ser. No. 14/542,136, filed on Nov. 14, 2014, incorporated herein by reference.

BACKGROUND

This invention relates to instruction ordering for in-progress operations.

Many computing systems utilize virtual memory systems to allow programmers to access memory addresses without having to account for where the memory addresses reside in the physical memory hierarchies of the computing systems. To do so, virtual memory systems maintain a mapping of virtual memory addresses, which are used by the programmer, to physical memory addresses that store the actual data referenced by the virtual memory addresses. The physical memory addresses can reside in any type of storage device (e.g., SRAM, DRAM, magnetic disk, etc.).

When a program accesses a virtual memory address, the virtual memory system performs an address translation to determine which physical memory address is referenced by the virtual memory address. The data stored at the determined physical memory address is read from the physical memory address, as an offset within a memory page, and returned for use by the program. The virtual-to-physical address mappings are stored in a "page table." In some cases, the virtual memory address be located in a page of a large virtual address space that translates to a page of physical memory that is not currently resident in main memory (i.e., a page fault), so that page is then copied into main memory.

Modern computing systems include one or more translation lookaside buffers (TLBs) which are caches for the page table, used by the virtual memory system to improve the speed of virtual to physical memory address translation. Very generally, a TLB includes a number of entries from the page table, each entry including a mapping from a virtual address to a physical address. Each TLB entry could directly cache a page table entry or combine several entries in the page table in such a way that it produces a translation from a virtual address to a physical address. In general, the entries of the TLB cover only a portion of the total memory available to the computing system. In some examples, the entries of the TLB are maintained such that the portion of the total available memory covered by the TLB includes the most recently accessed, most commonly accessed, or most likely to be accessed portion of the total available memory. In general, the entries of a TLB need to be managed whenever the virtual memory system changes the mappings between virtual memory addresses and physical memory addresses. This management may affect any operations that are in-progress from instructions that reference virtual memory address. In some systems, any instructions with in-progress operations are allowed to complete before a virtual memory address referenced by those instructions is invalidated.

SUMMARY

In one aspect, in general, an apparatus includes: one or more modules configured to execute memory instructions that access data stored in physical memory based on virtual addresses translated to physical addresses based on mappings in a page table; and memory management circuitry coupled to the one or more modules, the memory management circuitry including a first cache that stores a plurality of the mappings in the page table, and a second cache that stores entries based on virtual addresses. The memory management circuitry is configured to execute operations from the one or more modules, the executing including, in response to a first operation that invalidates at least a first virtual address, selectively ordering each of a plurality of in progress operations that were in progress when the first operation was received by the memory management circuitry, wherein a position in the ordering of a particular in progress operation depends on either or both of: (1) which of the one or more modules initiated the particular in progress operation, or (2) whether or not the particular in progress operation provides results to the first cache or second cache.

Aspects can include one or more of the following features.

The first operation is guaranteed to begin execution within a bounded number of clock cycles.

A position in the ordering of a particular in progress operation is selected to be either: (1) before the first operation, or (2) after the first operation.

The ordering corresponds to an ordering in which a set of operations appear to have been performed atomically without overlap of adjacent operations in the ordering.

A position in the ordering of a particular in progress operation depends on which of the one or more modules provided the particular in progress operation.

A first module of the one or more modules comprises a core configured as a central processing unit, and a second module of the one or more modules is configured for direct memory access without requiring the core.

A position in the ordering of a particular in progress operation is before the first operation if the particular in-progress operation was initiated by the second module.

Selecting the position of the particular in progress operation to be before the first operation includes allowing the particular in progress operation to continue execution concurrently with the first operation and preventing any results from the particular in progress operation generated after the first operation was received by the memory management circuitry from being used to modify the first cache or second cache.

A position in the ordering of a particular in progress operation depends on whether or not the particular in progress operation provides results to the first cache or second cache if the particular in progress operation was initiated by the first module.

The position of the particular in progress operation is selected to be before the first operation if the particular in progress operation does not provide results to the first cache or the second cache, and after the first operation if the particular in progress operation does provide results to the first cache or the second cache.

A position in the ordering of a particular in progress operation depends on whether or not the in progress operation provides results to the first cache or second cache.

The position of the particular in progress operation is selected to be before the first operation if the particular in progress operation does not provide results to the first cache or the second cache, and after the first operation if the particular in progress operation does provide results to the first cache or the second cache.

Selecting the position of the particular in progress operation to be before the first operation includes allowing the particular in progress operation to continue execution concurrently with the first operation.

Selecting the position of the particular in progress operation to be after the first operation includes aborting the particular in progress operation and re-starting the particular in progress operation after completing execution of the first operation.

The first cache comprises a translation lookaside buffer that stores a subset consisting of fewer than all of the mappings in the page table.

The second cache comprises a data cache that stores copies of data stored in the physical memory.

The second cache comprises a page table walker cache that stores a limited number of intermediate results provided by a page table walker that traverses levels of a hierarchical page table having multiple levels that each store intermediate results for determining the mappings.

The first operation comprises an operation that invalidates a range of virtual addresses that includes the first virtual address.

In another aspect, in general, a method includes: executing memory instructions using one or more modules that access data stored in physical memory based on virtual addresses translated to physical addresses based on mappings in a page table; and managing execution of the memory instructions using memory management circuitry coupled to the one or more modules, the memory management circuitry including a first cache that stores a plurality of the mappings in the page table, and a second cache that stores entries based on virtual addresses. The memory management circuitry executes operations from the one or more modules, the executing including, in response to a first operation that invalidates at least a first virtual address, selectively ordering each of a plurality of in progress operations that were in progress when the first operation was received by the memory management circuitry, wherein a position in the ordering of a particular in progress operation depends on either or both of: (1) which of the one or more modules initiated the particular in progress operation, or (2) whether or not the particular in progress operation provides results to the first cache or second cache.

Aspects can include one or more of the following features.

The first operation is guaranteed to begin execution within a bounded number of clock cycles.

A position in the ordering of a particular in progress operation is selected to be either: (1) before the first operation, or (2) after the first operation.

The ordering corresponds to an ordering in which a set of operations appear to have been performed atomically without overlap of adjacent operations in the ordering.

A position in the ordering of a particular in progress operation depends on which of the one or more modules provided the particular in progress operation.

A first module of the one or more modules comprises a core operating as a central processing unit, and a second module of the one or more modules performs direct memory access without requiring the core.

A position in the ordering of a particular in progress operation is before the first operation if the particular in-progress operation was initiated by the second module.

Selecting the position of the particular in progress operation to be before the first operation includes allowing the particular in progress operation to continue execution concurrently with the first operation and preventing any results from the particular in progress operation generated after the first operation was received by the memory management circuitry from being used to modify the first cache or second cache.

A position in the ordering of a particular in progress operation depends on whether or not the particular in progress operation provides results to the first cache or second cache if the particular in progress operation was initiated by the first module.

The position of the particular in progress operation is selected to be before the first operation if the particular in progress operation does not provide results to the first cache or the second cache, and after the first operation if the particular in progress operation does provide results to the first cache or the second cache.

A position in the ordering of a particular in progress operation depends on whether or not the in progress operation provides results to the first cache or second cache.

The position of the particular in progress operation is selected to be before the first operation if the particular in progress operation does not provide results to the first cache or the second cache, and after the first operation if the particular in progress operation does provide results to the first cache or the second cache.

Selecting the position of the particular in progress operation to be before the first operation includes allowing the particular in progress operation to continue execution concurrently with the first operation.

Selecting the position of the particular in progress operation to be after the first operation includes aborting the particular in progress operation and re-starting the particular in progress operation after completing execution of the first operation.

The first cache comprises a translation lookaside buffer that stores a subset consisting of fewer than all of the mappings in the page table.

The second cache comprises a data cache that stores copies of data stored in the physical memory.

The second cache comprises a page table walker cache that stores a limited number of intermediate results provided by a page table walker that traverses levels of a hierarchical page table having multiple levels that each store intermediate results for determining the mappings.

The first operation comprises an operation that invalidates a range of virtual addresses that includes the first virtual address.

Aspects can have one or more of the following advantages.

Techniques described herein enable a guaranteed deterministic latency for handling certain invalidation instructions. This guaranteed deterministic latency may be useful for avoiding the need for backpressure techniques for limiting the number of outstanding invalidation instructions. Such backpressure techniques could increase the complexity of the system in order to avoid or detect deadlock situations. Instead, the guaranteed deterministic latency is a useful requirement to impose for efficiently ensuring forward progress of invalidation instructions.

Other features and advantages of the invention will become apparent from the following description, and from the claims.

DESCRIPTION

Figure 1:
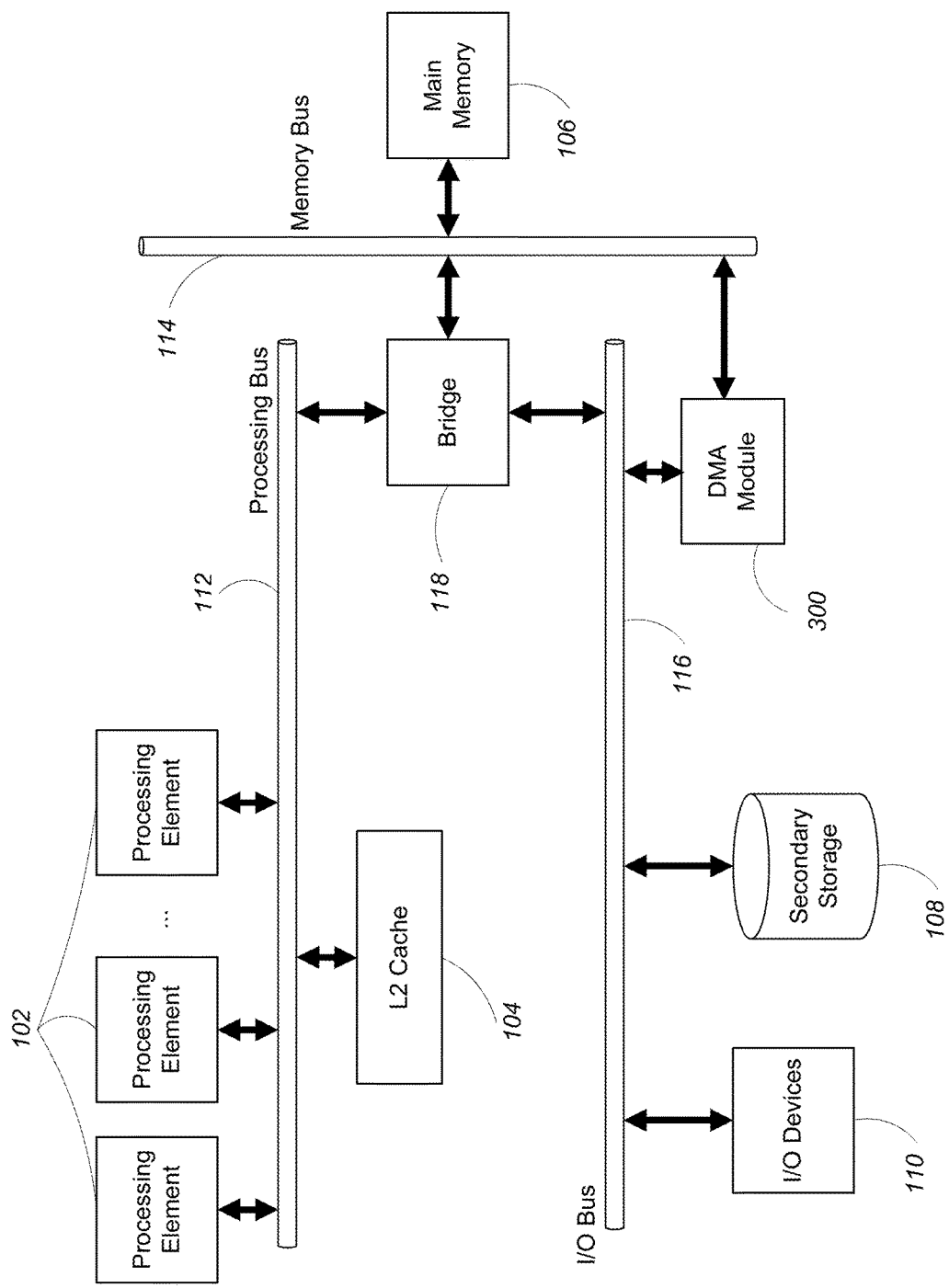
FIG. 1 is a computing system.

Referring to FIG. 1, a computing system 100 includes a number of processing elements 102, a level 2 (L2) cache 104 (e.g., SRAM), a main memory 106 (e.g., DRAM), a secondary storage device (e.g., a magnetic disk) 108, and one or more input/output (I/O) devices 110 (e.g., a keyboard or a mouse). The processing elements 102 and the L2 cache 104 are connected to a processor bus 112, the main memory 106 is connected to a memory bus 114, and the I/O devices 110 and the secondary storage device 108 are connected to an I/O bus 116. The processor bus 112, the memory bus 114, and the I/O bus 116 are connected to one another via a bridge 118. The computing system 100 also includes a direct memory access (DMA) module 300 that is able to access the main memory 106 over the memory bus 114 without requiring those accesses to be handled by the processing elements 102.

In general, the processing elements 102 execute instructions of one or more computer programs, including reading processor instructions and data from memory included in the computing system 100. As is well known in the art, the various memory or storage devices in the computing system 100 are organized into a memory hierarchy based on a relative latency of the memory or storage devices. One example of such a memory hierarchy has processor registers (not shown) at the top, followed by a level 1 (L1) cache (not shown), followed by the L2 cache 104, followed by the main memory 106, and finally followed by the secondary storage 108. When a given processing element 102 tries to access a memory address, each memory or storage device in the memory hierarchy is checked, in order from the top of the memory hierarchy down, to determine whether the data for the memory address is stored in the storage device or memory device.

For example, for a first processing element of the processing elements 102 to access a memory address for data stored only in the secondary storage device 108, the processing element first determines whether the memory address and data are stored in its L1 cache. Since the memory address and data are not stored in its L1 cache, a cache miss occurs, causing the processor to communicate with the L2 cache 140 via that processor bus 112 to determine whether the memory address and data are stored in the L2 cache 140. Since the memory address and data are not stored in the L2 cache, another cache miss occurs, causing the processor to communicate with the main memory 106 via the processor bus 112, bridge 110, and memory bus 118 to determine whether the memory address and data are stored in the main memory 106. Since the memory address and data are not stored in the main memory 106, another miss occurs (also called a "page fault"), causing the processor to communicate with the secondary storage device 108 via the processor bus, the bridge 118, and the I/O bus 116 to determine whether the memory address and data are stored in the secondary storage device 108. Since the memory address and data are stored in the secondary storage device 108, the data is retrieved from the secondary storage device 108 and is returned to the processing element via the I/O bus 116, the bridge 118, and the processor bus 112. The memory address and data may be cached in any number of the memory or storage devices in the memory hierarchy such that it can be accessed more readily in the future.

Figure 2:
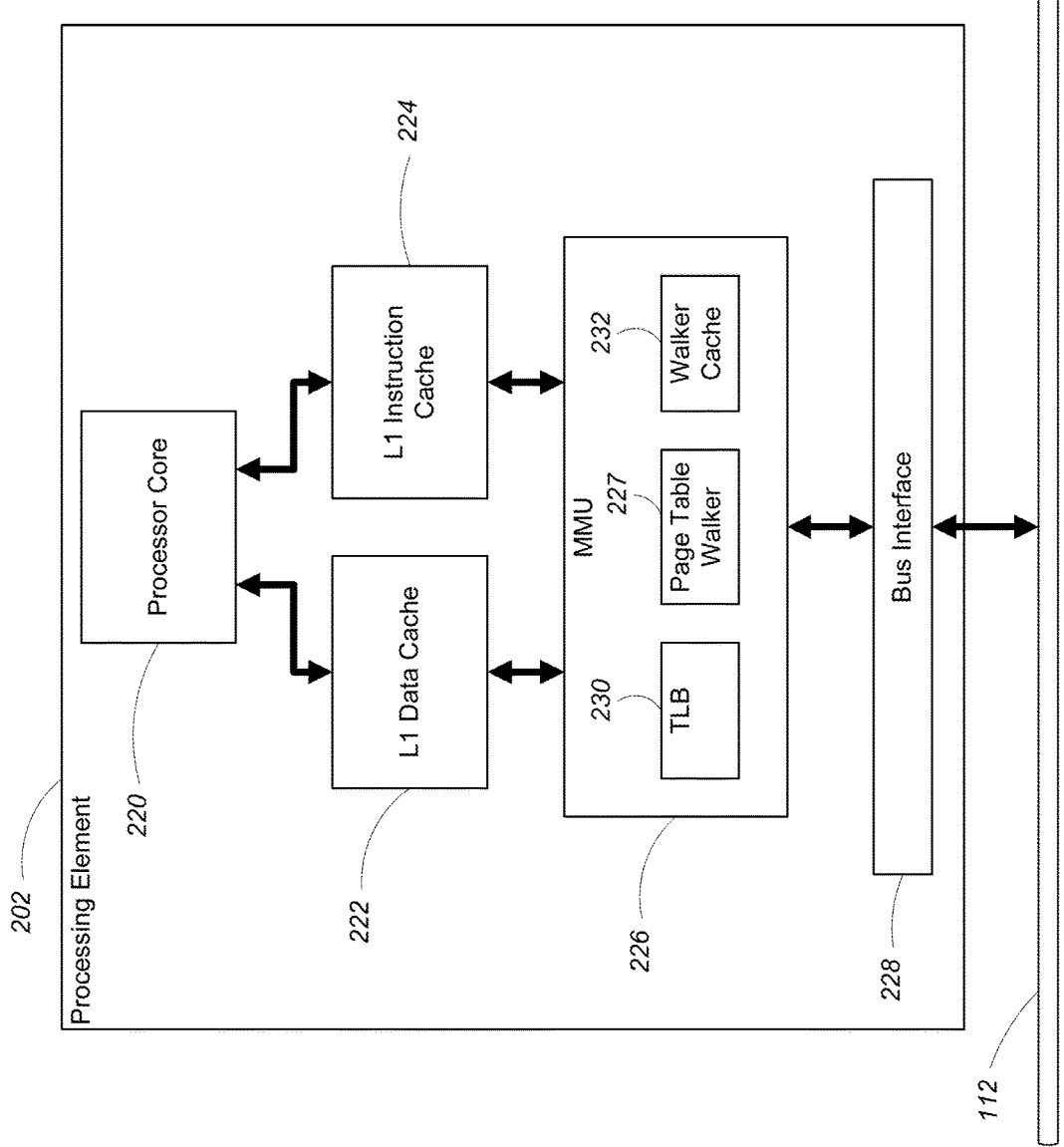
FIG. 2 is a processing element coupled to a processor bus.

Referring to FIG. 2, one example of a processing element 202 of the processing elements 102 of FIG. 1 is connected to the processor bus 112. The processing element 202 includes a processor core 220, an L1 data cache 222, an L1 instruction cache 224, a memory management unit (MMU) 226, and a bus interface 228. The processor core 220 (also called simply a "core") is an individual processor (also called a central processing unit (CPU)) that, together with other processor cores, coordinate to form a multi-core processor. The MMU 226 includes a page table walker 227, a translation lookaside buffer (TLB) 230, and a walker cache 232, each of which is described in more detail below.

Very generally, the processor core 220 executes instructions, which, in some cases, require access to memory addresses in the memory hierarchy of the computing system 100. The instructions executed by the processing element 202 of FIG. 2 use virtual memory addresses. A variety of other configurations of the memory hierarchy are possible. For example, the TLB 230 could be located outside of each processing element, or there could be one or more shared TLBs that are shared by multiple cores.

When the processor core 220 requires access to a virtual memory address associated with data, the processor core 220 sends a memory access request for the virtual memory address to the L1 data cache 222. The L1 data cache 222 stores a limited number of recently or commonly used data values tagged by their virtual memory addresses. If the L1 data cache 222 has an entry for the virtual memory address (i.e., a cache hit), the data associated with the virtual memory address is returned to the processor core 220 without requiring any further memory access operations in the memory hierarchy. Alternatively, in some implementations, the L1 data cache 222 tags entries by their physical memory addresses, which require address translation even for cache hits.

If the L1 data cache 222 does not have an entry for the virtual memory address (i.e., a cache miss), the memory access request is sent to the MMU 226. In general, the MMU 226 uses the TLB 230 to translate the virtual memory address to a corresponding physical memory address and sends a memory access request for the physical memory address out of the processor 202 to other elements of the memory hierarchy via the bus interface 228. The page table walker 227 handles retrieval of mappings that are not stored in the TLB 230, by accessing the full page table that is stored (potentially hierarchically) in one or more levels of memory. The page table walker 227 could be a hardware element as shown in this example, or in other examples the page table walker could be implemented in software without requiring a dedicated circuit in the MMU. The page table stores a complete set of mappings between virtual memory addresses and physical memory addresses that the page table walker 227 accesses to translate the virtual memory address to a corresponding physical memory address.

To speed up the process of translating the virtual memory address to the physical memory address, the TLB 230 includes a number of recently or commonly used mappings between virtual memory addresses and physical memory addresses. If the TLB 230 has a mapping for the virtual memory address, a memory access request for the physical memory address associated with the virtual memory address (as determined from the mapping stored in the TLB 230) is sent out of the processor 202 via the bus interface 228.

If the TLB 230 does not have a mapping for the for the virtual memory address (i.e., a TLB miss), the page table walker 227 traverses (or "walks") the levels of the page table to determine the physical memory address associated with the virtual memory address, and a memory request for the physical memory address (as determined from the mapping stored in the page table) is sent out of the processor 202 via the bus interface 228. Intermediate results returned by the page table walker 227 are cached in a walker cache 232 to speed subsequent page table walks.

In some examples, the TLB 230 and the page table are accessed in parallel to ensure that no additional time penalty is incurred when a TLB miss occurs.

Since the L1 data cache 222 and the TLB 230 can only store limited number of entries, cache management algorithms are required to ensure that the entries stored in the L1 data cache 222 and the TLB 230 are those that are likely to be re-used multiple times. Such algorithms evict and replace entries stored in the L1 data cache 222 and the TLB 230 based on a criteria such as a least recently used criteria.

In some examples, the computing system's virtual memory system may change its mappings between virtual memory addresses and physical memory addresses. In such cases, translation lookaside buffer invalidation instructions (TLBIs) for the virtual memory addresses are issued (e.g., by an operating system or by a hardware entity) to the TLBs or other entities in the computing system using virtual addresses to tag entries (i.e., the TLB 230 and walker cache 232). In general, a TLBI instruction includes a virtual memory address and causes invalidation of any TLB (or walker cache) entries associated with the virtual memory address. That is, when a TLB receives a TLBI for a given virtual memory address, any entries in the TLB storing mappings between the given virtual memory address and a physical memory address are invalidated.

Figure 3:
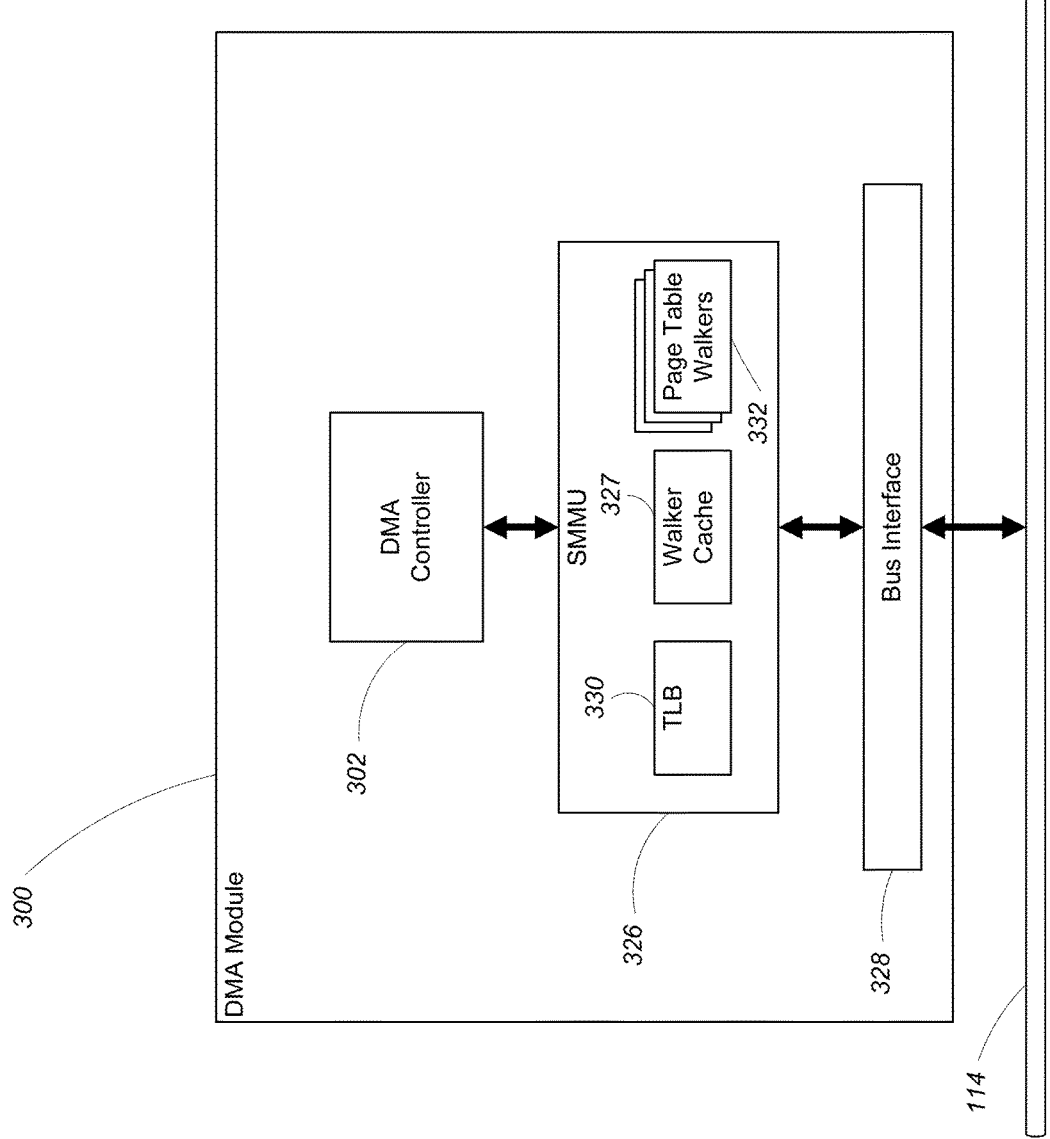
FIG. 3 is a direct memory access module.

FIG. 3 shows an example of the DMA module 300 connected to the memory bus 114. The DMA module 300 includes a DMA controller 302, a system MMU (SMMU) 326, and a bus interface 328. The SMMU 326 includes a TLB 330, a set of multiple page table walkers 332, and a walker cache 232. The DMA controller 302 enables a variety of different entities within the computing system 100 other than the processing elements 102 to access main memory 106 through the SMMU 326. For example, such accesses may be initiated by an I/O device 110. By including multiple page table walkers 332 (e.g., 16 page table walkers) multiple page table walk operations can be performed concurrently for different requesting entities, in the event of a translation miss in the TLB 330. Associated with those page table walkers 332 is a walker cache 327 that stores intermediate results from the walks. If a TLBI instruction is issued in a processing element 202, not only do the local TLB 230 and walker cache 232 need to be cleared of any invalid entries, but also the TLBs and walker caches of other processing elements 102 and of the DMA module 300. The DMA module 300 may perform different procedures in response to the TLBI instruction than a processing element 102, but both may carry out certain steps needed to ensure proper handling of the TLBI instruction.

In some implementations, the MMU 226 and SMMU 326 include a TLBI handler that is configured to guarantee deterministic latency for handling TLBI instructions. For example, the TLBI handler starts execution of a TLBI instruction immediately, or within a pre-determined maximum number of cycles. For a processing element 202, this may involve inserting the TLBI instruction into the pipeline of the processor core 220 soon enough to account for a maximum number of cycles P that may be needed to propagate through the pipeline (e.g., 9 cycles). If a TLBI instruction has to meet a maximum latency of L cycles between the TLBI handler receiving the TLBI instruction and the TLBI instruction completing execution, the TLBI handler must start execution within L-P cycles. Execution of the TLBI instruction may need enough cycles to remove entries for a range of virtual addresses from the TLB, for example.

The TLBI handler also needs to ensure that the ordering of operations performed by a series of instructions being executed in through the pipeline corresponds to an ordering in which those operations appear to have been performed atomically without overlap of adjacent operations in the ordering. Maintaining this appearance of atomic instruction execution, with respect to the software that has been compiled into the instructions being executed, is useful for ensuring correctness. This means that when the TLBI handler inserts a TLBI instruction into the pipeline, any in-progress operations of instructions that were issued before the TLBI instruction was received but not yet committed when the TLBI instruction was received need to appear as if they were atomically performed either completely before or completely after the TLBI instruction. The TLBI handler uses a variety of techniques for ensuring this atomicity in instruction execution.

One of the techniques is aborting an in-progress operation and re-starting it after the TLBI instruction is complete. However, this is not always possible since, there may be side-effects associated with the operation such that it is not possible to abort the operation without leaving the system in an inconsistent state. In some cases, even if there are no side-effects, re-starting may be costly. For example, an operation such as an I/O load operation may take a relatively large number of cycles to complete (e.g., around 10,000 cycles). If a TLBI instruction arrives after a significant portion of that time has already past, it would cost a significant number of cycles to abort and re-start that operation. As long as these operations do not produce results that are to be stored back into any of the caches using the virtual address being invalidated by the TLBI, it is safe to allow them to proceed concurrently with execution of the TLBI instruction.

For both the MMU 226 and the SMMU 326 acting as the TLBI handler, the TLBI instruction is acted upon within a predetermined number of cycles, as described above. However, in-progress operations may be handled differently depending on whether it is the MMU 226 handling an in-progress operation initiated within the processing element 202, or the SMMU 326 handling an in-progress operation initiated within the DMA module 300. Techniques for handling in-progress operations using a processing element's MMU 226 as a TLBI handler will be described first, following by techniques for handling in-progress operations using the SMMU 326 as a TLBI handler.

One aspect of handling an instruction with in-progress operation (an "in-progress instruction") in the MMU 226 involves determining the type of the instruction. Generally, the MMU 226 categorizes instructions into instructions that can be aborted and then re-started after the TLBI instruction has finished execution, and instructions that can continue executing concurrently with execution of the TLBI instruction. This categorization is made based on whether or not the instruction could potentially provide a result that is stored in a cache (e.g., a TLB or walker cache) tagged by a virtual address that is being invalidated by the TLBI instruction. The following are examples of how that categorization may be carried out.

If an instruction does not reference a virtual memory address, then that instruction will not be affected by a TLBI, so that instruction is allowed to proceed concurrently with the TLBI. In such a case, in the atomic ordering of operations, the in-progress instruction appears before the TLBI instruction, even if the in-progress instruction does not complete execution until after the TLBI instruction has completed execution. Again, because the in-progress instruction is not affected by any invalidations resulting from the TLBI instruction, this ordering is correct from the point of view of the software.

If an instruction does reference a reference virtual memory addresses, the MMU 226 further determines what type of instruction it is. Some virtual addresses translated by the MMU 226 are mapped to a portion of an address space reserved for instructions related to operations other than memory access operations. For example, a load operation may reference a virtual address mapped to values that are not physical addresses within memory, but instead identify the load operation as an I/O load operation that receives data from an I/O device. Before the translation is performed for that virtual address, it may not be possible to determine whether or not the load operation is a data load or an I/O load. So, there may be a lookup in the L1 data cache 222 that is performed on that virtual address in parallel with a lookup in the TLB 230. In the event that the operation is a memory load, the data cache lookup may result in a hit avoiding the need for the mapped physical address provided by the translation to be used. But, in the event that the operation is an I/O load, the data cache lookup will result in a miss (for implementations in which I/O loads are not cached).

If there was a miss in the TLB 230 and a TLBI instruction arrives during the translation process, it may not be evident yet what type of in-progress instruction (e.g., a memory load or an I/O load) is being executed. But, in any case, the in-progress instruction can be safely aborted and flushed form the pipeline and then re-started. This is because there would be no side-effects that would cause any inconsistencies in the state of the computation as a result of the aborted instruction. For example, a memory load instruction does not have any side-effects, and the side-effects of an I/O load do not start until after it translation is complete and it is determined that the instruction is an I/O load. In such a case, in the atomic ordering of operations, the in-progress instruction (after being re-started) appears after the TLBI instruction.

If there was a hit in the TLB 230, or if there was a miss and a TLBI instruction arrives after the translation process, the MMU 226 is able to categorize the in-progress instruction as one that should proceed because it is not affected by the TLBI instruction (e.g., an I/O load), or one that should be aborted and re-started after the TLBI instruction because it could be affected by it (e.g., a memory load).

Handling an in-progress operation in the SMMU 326 does require categorization of different operation types. Generally, the operations that will be in-progress when a TLBI instruction arrives at the SMMU 326 are page table walk operations (or simply "walk operations"). There may be many such walk operations in progress since there may be many page table walkers 332, and each walk operation may take many cycles (e.g., 1000 s of cycles). Each page table walker 332 is configured to detect when a TLBI instruction arrives at the SMMU 326 during an in-progress walk operation. The walk operation is allowed to continue concurrently with handling of the TLBI instruction, but any intermediate results returned by the walk operation after the detected arrival time of the TLBI instruction are blocked from being added to the walker cache 327, and any final result returned at the end of the walk operation after the detected arrival time of the TLBI instruction is blocked from being added to the TLB 330.

Alternatively, in some implementations, a page table walker 332 may be configured to enter a filtering mode after detection of a TLBI instruction. In the filtering mode, the page table walker 332 compares a virtual address associated with a result to a virtual address (or range of virtual addresses) being invalidated by the TLBI instruction. If there is a match, the result is blocked. If there is no match, the result is allowed to be written into the TLB 330 or walker cache 327. Of course, any results written into the TLB 330 or walker cache 327 by an in-progress walk operation before the detected arrival time do not pose a problem, since those results will be removed if necessary as part of performing a TLBI operation.

Thus, for any in-progress walk operations performed in the SMMU 326, in the atomic ordering of operations, the in-progress walk operation appears before the TLBI operation, even if the in-progress walk operation does not complete execution until after the TLBI operation has completed.

Other embodiments are within the scope of the following claims.

What is claimed is:

1. An apparatus comprising:
   one or more modules configured to execute memory instructions that access data stored in physical memory based on virtual addresses translated to physical addresses based on mappings in a page table; and
   memory management circuitry coupled to the one or more modules, the memory management circuitry including a first cache that stores a plurality of the mappings in the page table, and a second cache that stores entries based on virtual addresses;
   wherein the memory management circuitry is configured to execute operations from the one or more modules, the executing including selectively ordering each of a plurality of in-progress operations that were in progress within a processor pipeline when a first operation was received by the memory management circuitry,
   wherein said selectively ordering is with respect to completing execution within said processor pipeline, and is performed in response to the first operation being received,
   wherein the first operation invalidates at least a first virtual address as a result of inserting an instruction into the pipeline within a pre-determined maximum number of cycles after the first operation was received, wherein the pre-determined maximum number of cycles is determined based at least in part on (1) a guaranteed maximum latency and (2) a maximum number of cycles needed for the inserted instruction to propagate through the pipeline, and
   wherein a position in said selective ordering of a particular in-progress operation depends on whether or not the particular in-progress operation provides results to at least one of the first cache or second cache.

2. The apparatus of claim 1, wherein a position in said selective ordering of the particular in-progress operation is selected to be either: (1) before the first operation, or (2) after the first operation.

3. The apparatus of claim 2, wherein execution of a set of operations by the memory management circuitry includes overlap in the execution of the first operation and the particular in-progress operation, but results of execution of the set of operations, with respect to their effect on other operations executed by the memory management circuitry, are provided atomically without overlap of any effects of results of the first operation and any effects of results of the particular in-progress operation.

4. The apparatus of claim 2, wherein a first module of the one or more modules comprises a core configured as a central processing unit, and a second module of the one or more modules is configured for direct memory access without requiring the core.

5. The apparatus of claim 4, wherein a position in said selective ordering of the particular in-progress operation is before the first operation if the particular in-progress operation was initiated by the second module.

6. The apparatus of claim 5, wherein selecting the position of the particular in-progress operation to be before the first operation includes allowing the particular in-progress operation to continue execution concurrently with the first operation and preventing any results from the particular in-progress operation generated after the first operation was received by the memory management circuitry from being used to modify the first cache or second cache.

7. The apparatus of claim 5, wherein the particular in-progress operation was initiated by the first module.

8. The apparatus of claim 7, wherein the position of the particular in-progress operation is selected to be before the first operation if the particular in-progress operation does not provide results to the first cache and does not provide results to the second cache, and after the first operation if the particular in-progress operation does provide results to at least one of the first cache or the second cache.

9. The apparatus of claim 2, wherein a position in said selective ordering of the particular in-progress operation depends on whether or not the in-progress operation provides results to at least one of the first cache or the second cache.

10. The apparatus of claim 9, wherein the position of the particular in-progress operation is selected to be before the first operation if the particular in-progress operation does not provide results to the first cache and does not provide results to the second cache, and after the first operation if the particular in-progress operation does provide results to at least one of the first cache or the second cache.

11. The apparatus of claim 10, wherein selecting the position of the particular in-progress operation to be before the first operation includes allowing the particular in-progress operation to continue execution concurrently with the first operation.

12. The apparatus of claim 10, wherein selecting the position of the particular in-progress operation to be after the first operation includes aborting the particular in-progress operation and re-starting the particular in-progress operation after completing execution of the first operation.

13. The apparatus of claim 1, wherein the first cache comprises a translation lookaside buffer that stores a subset consisting of fewer than all of the mappings in the page table.

14. The apparatus of claim 1, wherein the second cache comprises a data cache that stores copies of data stored in the physical memory.

15. The apparatus of claim 1, wherein the second cache comprises a page table walker cache that stores a limited number of intermediate results provided by a page table walker that traverses levels of a hierarchical page table having multiple levels that each store intermediate results for determining the mappings.

16. The apparatus of claim 1, wherein the first operation comprises an operation that invalidates a range of virtual addresses that includes the first virtual address.

17. A method comprising:
executing memory instructions using one or more modules that access data stored in physical memory based on virtual addresses translated to physical addresses based on mappings in a page table; and
managing execution of the memory instructions using memory management circuitry coupled to the one or more modules, the memory management circuitry including a first cache that stores a plurality of the mappings in the page table, and a second cache that stores entries based on virtual addresses;
wherein the memory management circuitry executes operations from the one or more modules, the executing including selectively ordering each of a plurality of in-progress operations that were in progress within a processor pipeline when a first operation was received by the memory management circuitry,
wherein said selectively ordering is with respect to completing execution within said processor pipeline, and is performed in response to the first operation being received,
wherein the first operation invalidates at least a first virtual address as a result of inserting an instruction into the pipeline within a pre-determined maximum number of cycles after the first operation was received, wherein the pre-determined maximum number of cycles is determined based at least in part on (1) a guaranteed maximum latency and (2) a maximum number of cycles needed for the inserted instruction to propagate through the pipeline, and
wherein a position in said selective ordering of a particular in-progress operation depends on whether or not the particular in-progress operation provides results to at least one of the first cache or second cache.

18. The method of claim 17, wherein a position in said selective ordering of the particular in-progress operation is selected to be either: (1) before the first operation, or (2) after the first operation.

19. The method of claim 18, wherein execution of a set of operations by the memory management circuitry includes overlap in the execution of the first operation and the particular in-progress operation, but results of execution of the set of operations, with respect to their effect on other operations executed by the memory management circuitry, are provided atomically without overlap of any effects of results of the first operation and any effects of results of the particular in-progress operation.

20. The method of claim 18, wherein a first module of the one or more modules comprises a core operating as a central processing unit, and a second module of the one or more modules performs direct memory access without requiring the core.

21. The method of claim 20, wherein a position in said selective ordering of the particular in-progress operation is before the first operation if the particular in-progress operation was initiated by the second module.

22. The method of claim 21, wherein selecting the position of the particular in-progress operation to be before the first operation includes allowing the particular in-progress operation to continue execution concurrently with the first operation and preventing any results from the particular in-progress operation generated after the first operation was received by the memory management circuitry from being used to modify the first cache or second cache.

23. The method of claim 21, wherein the particular in-progress operation was initiated by the first module.

24. The method of claim 23, wherein the position of the particular in-progress operation is selected to be before the first operation if the particular in-progress operation does not provide results to the first cache and does not provide results to the second cache, and after the first operation if the particular in-progress operation does provide results to at least one of the first cache or the second cache.

25. The method of claim 18, wherein a position in said selective ordering of the particular in-progress operation depends on whether or not the in-progress operation provides results to at least one of the first cache or the second cache.

26. The method of claim 25, wherein the position of the particular in-progress operation is selected to be before the first operation if the particular in-progress operation does not provide results to the first cache and does not provide results to the second cache, and after the first operation if the particular in-progress operation does provide results to at least one of the first cache or the second cache.

27. The method of claim 26, wherein selecting the position of the particular in-progress operation to be before the first operation includes allowing the particular in-progress operation to continue execution concurrently with the first operation.

28. The method of claim 26, wherein selecting the position of the particular in-progress operation to be after the first operation includes aborting the particular in-progress operation and re-starting the particular in-progress operation after completing execution of the first operation.

29. The method of claim 17, wherein the first cache comprises a translation lookaside buffer that stores a subset consisting of fewer than all of the mappings in the page table.

30. The method of claim 17, wherein the second cache comprises a data cache that stores copies of data stored in the physical memory.

31. The method of claim 17, wherein the second cache comprises a page table walker cache that stores a limited number of intermediate results provided by a page table walker that traverses levels of a hierarchical page table having multiple levels that each store intermediate results for determining the mappings.

32. The method of claim 17, wherein the first operation comprises an operation that invalidates a range of virtual addresses that includes the first virtual address.

* * * * *